March 30, 1937.  M. HANDELMAN  2,075,608

KNIFE SHARPENER MACHINE

Filed Oct. 24, 1936

INVENTOR
*Morris Handelman*
BY
ATTORNEY

Patented Mar. 30, 1937

2,075,608

UNITED STATES PATENT OFFICE 2,075,608

KNIFE SHARPENER MACHINE

Morris Handelman, Brooklyn, N. Y.

Application October 24, 1936, Serial No. 107,437

4 Claims. (Cl. 51—80)

This invention relates to new and useful improvements in a knife or the like sharpener machine.

The invention has for an object the construction of a knife sharpener machine which is characterized by a pair of grindstone wheels driven in opposite directions and adapted to be adjusted to various distances from each other, or to be substantially in contact with each other, under adjusted resilient pressures.

Still further the invention contemplates arranging the grindstone wheels so that they rotate in a common plane and it is possible to engage a knife between the contacting portions thereof.

Another one of the objects of this invention is to so arrange the grindstone wheels that they operate at right angles to each other.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Figure 1:
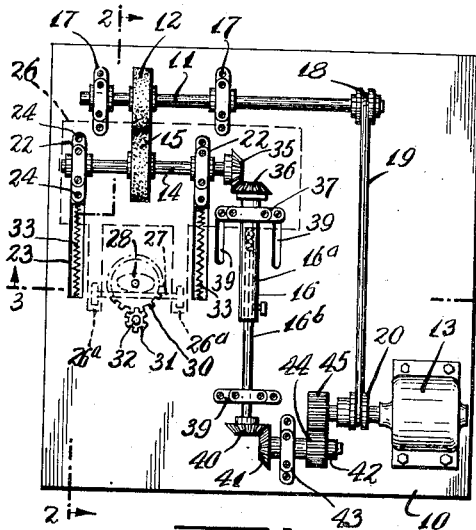
Fig. 1 is a plan view of a knife sharpener machine constructed according to this invention.

The knife sharpener machine comprises a base 10 upon which a shaft 11 is rotatively supported. This shaft carries a grindstone wheel 12 and is associated with a driving means including the electric motor 13. A second shaft 14 supports a second grindstone wheel 15 cooperating with the first grindstone wheel 12 for sharpening knives and other implements. This second shaft 14 is rotatively and adjustably mounted on the base 10 and is associated with a means by which it may be held in various positions for changing the operative relation of said grindstone wheels. This second shaft is associated with a driving means including a flexible or adjustable coupling 16 to operate in all adjusted positions of the second shaft.

The base 10 comprises a substantially flat and relatively thin member. The shaft 11 is rotatively supported in a pair of standards 17 spaced from each other and fixedly mounted on the base 10. A small pulley 18 is mounted on the shaft 11 and connects with a belt 19 which engages over a small pulley 20 mounted on the shaft of the electric motor 13. These pulleys and the belt comprise the driving means for the shaft 11. The second shaft 14 is rotatively supported in a pair of bearings 22 which are spaced from each other and which are slidably mounted in grooves 23 formed in the top surface of the base 10. These grooves are disposed at right angles to the shaft 11. Each of the bearings 22 are formed with dove tailed feet portion 22' which engage the grooves 23 which are of corresponding shapes. The grindstone wheels 12 and 15 are arranged substantially in a common plane so that a knife may be drawn between them for sharpening.

The bearings 22 are provided with bolts or pins 24 which extend through slots 25 in the bases of the grooves 23 to the underside of the base 10. These pins hold a plate element 26 slightly spaced beneath the lower face of the base 10. This plate 26 is provided with a pair of forward projecting fingers 26ª between which a rod 27 is mounted. This rod 27 engages against a cam 28 which is fixed on a spindle 29 passing through the base 10. A gear 30 is fixed on the top of the spindle 29 and meshes with a pinion 31 rotatively supported in the top face of the base 10.

A knob 32 is fixed upon the top pinion 31 by which the pinion may be manually turned. A pair of springs 33 are housed within the grooves 23 and act between the free ends of the grooves and the bearings 22 for urging the bearings in a direction so that the grindstone wheel 15 is urged against the grindstone wheel 12. The knob 32 may be turned for indirectly turning the cam 28 and indirectly moving the plate 26 to adjust the pressures between the grindstone wheels 12 and 15, or their distances. Furthermore, the springs 33 resiliently hold the bearings 22 so that under load they may move to space apart the grindstone wheels 15 and 12.

A means is provided for driving the second shaft 14 and consists essentially of a bevel gear 35 fixed on the shaft 14 and meshing with a bevel gear 36 fixed on a shaft element 16ª. This shaft element 16ª is rotative in a bearing 37 which is supported by pins or bolts 38 passing through slots 39 in the base 10. These pins or bolts 38 connect with the plate 26. The shaft section 16ª is formed with a square or similar shaped opening into which there slidably engages a shaft section 16ᵇ. This latter section is rotative in a bearing 39 fixedly mounted on the base 10. A bevel gear 40 is mounted on the shaft section 16b and meshes with a bevel gear 41 mounted on a stud shaft 42 rotative in a bearing 43 fixedly mounted on the base 10. A spring 16c is placed within the opening in shaft section 16a for the purpose of keeping bevel gears 40 and 41 in mesh. The stud shaft 42 carries a spur gear 44 meshing with a spur gear 45 fixed on the shaft of the motor 13.

The operation of the device is as follows:—
Rotations from the motor 13 will be transmitted to simultaneously indirectly drive the shafts 11 and 14 in opposite directions. The shaft 11 is driven by the belt 19 which is connected with the motor 13. The shaft 14 is driven by the bevel gears 35 and 36 and the transmission system terminating in the gears 44 and 45, the latter gear being connected directly with the motor 13.

The springs 33 urge the bearings 22 towards the shaft 11 and so resiliently urge the grindstone wheel 15 against the grindstone wheel 12. The bearings 22 are held against the action of the springs 33 by reason of the fact that they are directly mounted on the plate 26 which in turn is provided with a bar 27 engaging a cam 28. This cam 28 is adjustable indirectly by the knob 32. Thus, the knob may be turned to rotate the cam and force the plate 26 to different adjusted positions against the action of the springs 33. The flexible or adjustable coupling 16, consisting of the inter-engaging shaft sections 16a and 16b, permit the shaft 14 to be driven in all of its adjusted positions.

Figure 4:
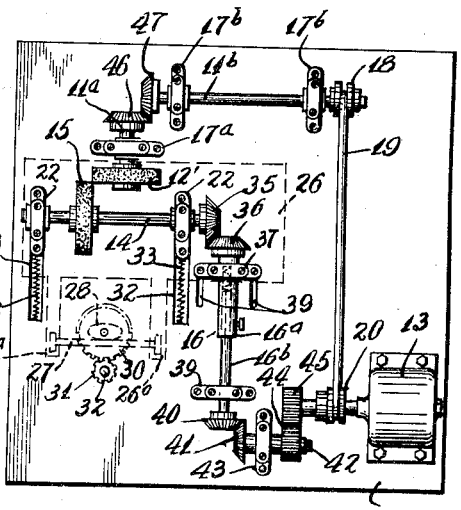
Fig. 4 is a plan view of a knife sharpener machine constructed according to another modification of this invention.
Figure 2:
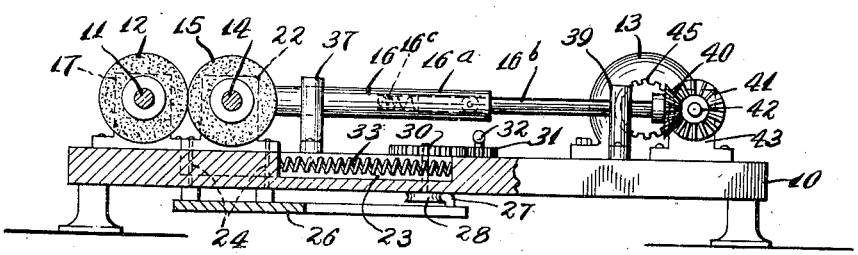
Fig. 2 is a sectional view taken on the line 2—2 of Fig. 1.
Figure 3:
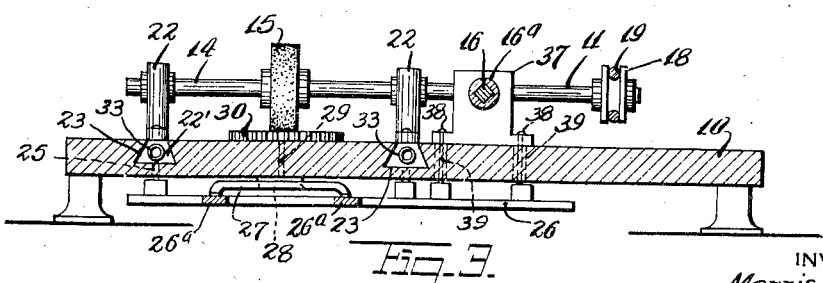
Fig. 3 is a sectional view taken on the line 3—3 of Fig. 1.

In Fig. 4 a modified form of the invention has been disclosed which is very similar to the prior form except for the fact that the grindstone wheels 12' and 15 are arranged at right angles to each other. This is accomplished by reason of the grindstone wheel 12' being mounted on a shaft 11a which is rotative in a bearing 17a. This shaft action 11a is at right angles to the shaft 14. Furthermore, this shaft section 11a is provided with a bevel gear 46 meshing with a bevel gear 47 on a shaft 11b rotative in a bearing 17b. This shaft 11b is provided with the pulley 18 driven by the belt 19. The shaft 14 is supported and driven in the identical manner and by the identical parts used in the previous form of the invention, these parts being recognizable by the same reference numerals.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:—

1. A knife sharpener machine comprising a base, a shaft supporting a grindstone and rotatively mounted on said base, means for driving said shaft, a second shaft supporting a second grindstone cooperative with said first grindstone for sharpening knives and other implements, said second shaft being rotatively and adjustably mounted on said base, means for holding said second shaft in various positions for changing the cooperative relation of said grindstones, and means for driving said second shaft flexible to operate in all adjusted positions of said second shaft, said means for driving said shaft comprising a motor mounted on said base and a driving mechanism between said motor and shaft, said means for driving the second shaft comprising a driving mechanism connected with said motor and with said second shaft.

2. A knife sharpener machine comprising a base, a shaft supporting a grindstone and rotatively mounted on said base, means for driving said shaft, a second shaft supporting a second grindstone cooperative with said first grindstone for sharpening knives and other implements, said second shaft being rotatively and adjustably mounted on said base, means for holding said second shaft in various positions for changing the cooperative relation of said grindstones, and means for driving said second shaft flexible to operate in all adjusted positions of said second shaft, said means for holding the second shaft adjusted comprising pins or bolts mounted upon bearings supporting the second shaft and extending through slots in said base, a plate beneath said base mounted on said pins or bolts, said plate being provided with a pair of projecting fingers, a rod mounted between said fingers, a cam engaging against said rod, means for holding said cam in various adjusted positions, and resilient means for urging said bearings to force said second shaft towards said first shaft.

3. In a knife sharpener machine, a base, a grindstone rotatively supported on said base, an adjustable grindstone rotatively supported on said base and engageable cooperative with said grindstone, and means for driving said grindstone in opposite direction, said adjustable mounting, comprising a standard rotatively supporting a shaft on which said adjustable grindstone is mounted, depending pins on said standard engageable through slots in said base, a plate mounted beneath said base and on said pin, a bar fixedly mounted on said plate, a resilient means for urging said grindstone together, and a cam element rotatively mounted through said base and engaging said rod so that when said cam is turned it moves said plate to draw said adjustable grindstone away from said grindstone against the normal action of said resilient means.

4. In a knife sharpener machine, a base, a grindstone rotatively supported on said base, an adjustable grindstone rotatively supported on said base and engageable cooperative with said grindstone, and means for driving said grindstone in opposite direction, said adjustable mounting, comprising a standard rotatively supporting a shaft on which said adjustable grindstone is mounted, depending pins on said standard engageable through slots in said base, a plate mounted beneath said base and on said pin, a bar fixedly mounted on said plate, a resilient means for urging said grindstone together, and a cam element rotatively mounted through said base and engaging said rod so that when said cam is turned it moves said plate to draw said adjustable grindstone away from said grindstone against the normal action of said resilient means, said resilient means, comprising a dovetailed foot portion on said standard engageable in a coacting slot in said base, and an extension spring within said slot and acting between the end of said slot and said foot portion pushing said adjustable grindstone against said grindstone.

MORRIS HANDELMAN.